(12) United States Patent
Xu et al.

(10) Patent No.: US 12,479,271 B2
(45) Date of Patent: Nov. 25, 2025

(54) CONTROL SYSTEM FOR THERMAL MANAGEMENT AND DISTRIBUTION

(71) Applicant: DENSO CORPORATION, Kariya (JP)

(72) Inventors: Zhaoliang Xu, Shanghai (CN); Nan Li, Shanghai (CN); Xiaohua Xu, Shanghai (CN); Kai Wu, Shanghai (CN); Kota Sakamoto, Shanghai (CN)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 18/516,113

(22) Filed: Nov. 21, 2023

(65) Prior Publication Data

US 2024/0083218 A1 Mar. 14, 2024

Related U.S. Application Data

(63) Continuation of application No. PCT/JP2022/005571, filed on Feb. 14, 2022.

(30) Foreign Application Priority Data

May 26, 2021 (CN) .......................... 202110575739.5

(51) Int. Cl.
*B60H 1/06* (2006.01)
*B60H 1/00* (2006.01)

(52) U.S. Cl.
CPC ........... *B60H 1/06* (2013.01); *B60H 1/00899* (2013.01)

(58) Field of Classification Search
CPC .. B60H 1/06; B60H 1/00885; B60H 1/00278; B60H 2001/00307; B60L 58/27; H01M 10/615; H01M 10/625
See application file for complete search history.

(56) References Cited

U.S. PATENT DOCUMENTS

| | | | | |
|---|---|---|---|---|
| 11,679,691 B2* | 6/2023 | Yang | .................... | H01M 10/63 |
| | | | | 429/62 |
| 2017/0021698 A1* | 1/2017 | Hatakeyama | .......... | B60H 1/143 |
| 2021/0316590 A1* | 10/2021 | Fuse | .................... | B60H 1/323 |
| 2022/0011006 A1 | 1/2022 | Miura et al. | | |
| 2024/0017584 A1* | 1/2024 | Hasegawa | .......... | B60H 1/32284 |
| 2024/0198755 A1* | 6/2024 | Sakamoto | ............ | B60H 1/3204 |

FOREIGN PATENT DOCUMENTS

| | | |
|---|---|---|
| CN | 210652590 U | 6/2020 |
| JP | 2020122621 A | 8/2020 |
| JP | 2020164153 A | 10/2020 |

* cited by examiner

*Primary Examiner* — Marc E Norman
(74) *Attorney, Agent, or Firm* — Harness, Dickey & Pierce, P.L.C.

(57) ABSTRACT

A cabin heating circuit includes a first pump, a heat source, and a heater core. A battery heating circuit includes a first flow path that branches off from the cabin heating circuit at a three-way flow control valve. The battery heating circuit further includes a second flow path that is independent of the first flow path. The first flow path and the second flow path are thermally coupled by a heat exchanger. The second flow path includes the heat exchanger, a second pump, and a battery heat exchanger. The control unit adjusts an output of the heat source, an opening degree of the three-way flow control valve, an output of the first pump, and an output of the second pump. If a cabin and a battery are heated simultaneously, the control unit regulates the output of the first pump and/or the output of the second pump.

8 Claims, 1 Drawing Sheet

CONTROL SYSTEM FOR THERMAL MANAGEMENT AND DISTRIBUTION

CROSS REFERENCE TO RELATED APPLICATION

The present application is a continuation application of International Patent Application No. PCT/JP2022/005571 filed on Feb. 14, 2022, which designated the U.S. and is based on and claims the benefit of priority from Chinese Patent Application No. 202110575739.5 filed in People's Republic of China on May 26, 2021, and all the contents of the application are incorporated by reference.

TECHNICAL FIELD

This disclosure relates to a field of thermal management technology for vehicles, and specifically to a thermal management and distribution control system.

BACKGROUND

Batteries used in new energy vehicles need to be operated within a reasonable temperature range. If a battery temperature is too low, an effective output electrical energy and voltage will be affected, which may reduce the performance of the battery and reduce cruising power of a vehicle. Therefore, if the battery temperature is low, it must be heated to maintain proper operating temperature. On the other hand, in cold environments, there is a demand for heating the cabin. Generally, hot water heated by a heat source is supplied to an inside of a heater core (radiator) for heating through a water intake pipe. The heater core transfers a heat quantity of the hot water to air blown by a blower. Heating is performed by converting blown air into warm air. Therefore, the battery that needs to be heated and the heater core may be installed in the same circuit and heated at the same time.

SUMMARY

In the above aspects, or in other aspects not mentioned, there is a need for further improvements in a thermal management and distribution control system.

A thermal management and distribution control system in accordance with one aspect of this disclosure includes a cabin heating circuit, a battery heating circuit, and a control unit. The cabin heating circuit includes a heat source, a first pump, and a heater core. The battery heating circuit includes a first flow path, a second flow path, and a heat exchanger. The first flow path of the battery heating circuit is connected to the cabin heating circuit via a three-way flow control valve in such a manner that the heat exchanger and the heater core are installed in parallel. The second pump and the battery heat exchanger are installed on the second flow path. The first flow path and the second flow path are independent from each other. In the battery heating circuit, the heat exchanger performs heat exchange between a coolant in the first flow path and a coolant in the second flow path. The control unit adjusts an output of the heat source, an opening degree of the three-way flow control valve, an output of the first pump, and an output of the second pump. If a cabin and a battery are heated simultaneously, the control unit regulates the output of the first pump and/or the output of the second pump.

According to this disclosure, if an inside of the cabin and the battery are heated simultaneously, an output of the heat source, an opening degree of the three-way flow control valve, and outputs of the first pump and the second pump are adjusted. Thereby, an amount of heat supplied from the heat source is distributed according to a difference in demand between the air conditioning side and the battery side.

According to this disclosure, the amount of heat supplied from the heat source is distributed accurately over a wide range, and a comfort of cabin heating is ensured in a process of distributing the amount of heat supplied from the heat source.

BRIEF DESCRIPTION OF DRAWINGS

The disclosure is further described with reference to the accompanying drawings in which.

DETAILED DESCRIPTION

It is an object of this disclosure to provide a thermal management and distribution control system that is capable of realizing accurate distribution of an amount of heat supplied from the heat source over a wide range and ensuring a comfort of a cabin heating in a thermal distribution process.

In the following, this disclosure is further explained in conjunction with the drawings and the embodiments described below. However, it should be understood that the drawings and the embodiments described below are for illustrating this disclosure and are not intended to limit this disclosure. In the description of this disclosure, it must be explained that orientations and positional relationships indicated by the terms "top", "bottom", "left", "right", etc. refer to orientations and positional relationships shown in the drawings and are solely for purposes of facilitating and simplifying descriptions of this disclosure. Thus, these terms are not intended to indicate or imply that a device or an element to which they are depicted has a particular orientation, is constructed or operative in a particular manner. It should be understood that those terms cannot be construed as limitations on this disclosure. In this disclosure, "top", "bottom", "left", and "right" refer to "top", "bottom", "left", and "right" with respect to a surface of the drawing.

This disclosure discloses a thermal management and distribution control system that can realize an accurate distribution of an amount of heat supplied from the heat source over a wide range. In addition, this disclosure discloses a thermal management and distribution control system that can ensure a comfort of cabin heating in a process of distributing heat quantity supplied from the heat source.

Figure 1:
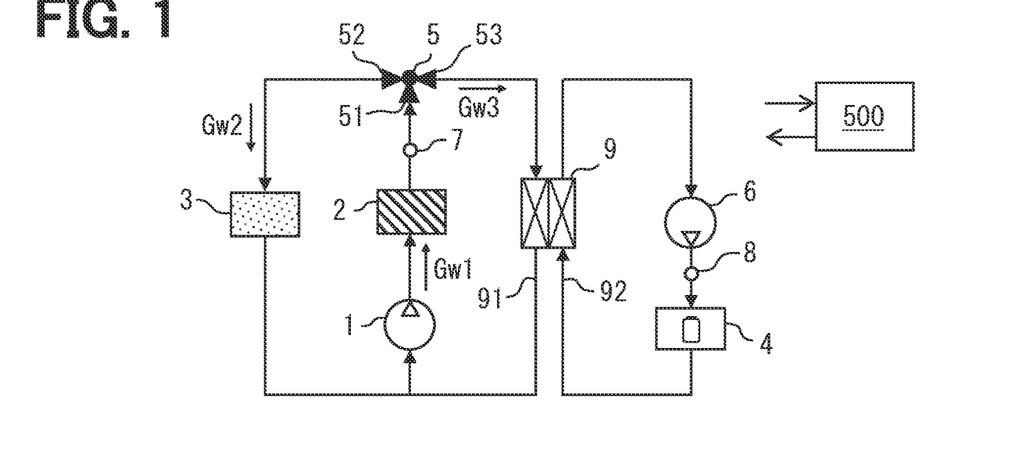
FIG. 1 is a schematic circuit diagram of a thermal management and distribution control system according to one embodiment of this disclosure.

FIG. 1 is a schematic circuit diagram of a thermal management and distribution control system according to one embodiment of this disclosure; As shown in FIG. 1, the thermal management and distribution control system includes a cabin heating circuit and a battery heating circuit.

The cabin heating circuit is primarily used to increase a temperature of the cabin by flowing heated coolant into the heater core. The cabin heating circuit includes a first pump 1 for pumping the coolant, a heat source 2 for heating the coolant, and a heater core 3 for radiating heat toward an interior of the cabin, which are connected in series. The heat source 2 may be, for example, an HVH high-voltage electric heater that directly heats the coolant. Only one heat source 2 or a plurality of heat source 2 may be installed in the cabin heating circuit according to an actual demand. The heater core 3 may be, for example, a heat exchanger called a hot-air core that provides heat exchange between fluid and air. The fluid is provided by a heat transport medium such as water, antifreeze, etc., also may be called cooling fluid. The heater core 3 introduces the coolant heated by the heat source 2 through a water intake port. The heater core 3 takes in air blown by the blower. The heater core 3 heats air using a heat quantity of the coolant, and supplies heat to the cabin through the air duct. The heater core 3 discharges a low temperature coolant that has radiated heat to the air through a water outlet port. In the cabin heating circuit of the thermal management and distribution control system, the first pump 1 is connected to the heat source 2 and the heater core 3 in series in such a manner that an outlet side faces upwardly on a surface of the drawing.

When the first pump 1 is activated, the coolant is pumped by the first pump 1 to the heat source 2 and is heated to increase a temperature. After the temperature has increased, the coolant flows into the heater core 3 and radiates heat to air. After being discharged from the heater core 3, the coolant flows into the first pump 1 again. The coolant circulates counterclockwise within the cabin heating circuit. Further, as shown in FIG. 1, a first temperature sensor 7 is provided on the cabin heating circuit on a side of an inlet port of the heater core 3 (that is, on a side of an outlet port of the heat source 2). The first temperature sensor 7 is used to detect the temperature of the coolant flowing into the heater core 3. The first temperature sensor 7 is connected to the control unit 500 and provides a detection signal.

The battery heating circuit mainly uses heated coolant to heat the battery heat exchanger 4. The battery heating circuit is thereby used to exchange heat with the battery via the battery heat exchanger 4 to increase a temperature of the battery. As shown in FIG. 1, the battery heating circuit includes a first flow path 91, a second flow path 92, and a heat exchanger 9 which performs heat exchange between the first flow path 91 and the second flow path 92.

Among them, the first flow path 91 is connected to the cabin heating circuit in such a manner that the heat exchanger 9 and the heater core 3 are arranged in parallel. In other words, the first flow path 91 allows a part of the coolant in the cabin heating circuit to flow around the heater core 3 and to flow into the heat exchanger 9 directly. The cabin heating circuit including the first pump 1, the heat source 2, and the heater core 3 may also be called a main circulation flow path. The first flow path 91 may also be called a branch flow path branching from the main circulation flow path. A flow rate in the main circulation flow path and a flow rate in the first flow path 91 have a complementary relationship because they influence each other. From this point of view, the first flow path 91 is a subordinate flow path to the main circulation flow path.

The first flow path 91 and the second flow path 92 are independent from each other. The first flow path 91 and the second flow path 92 perform heat exchange in the heat exchanger 9. The heat exchanger 9 performs heat exchange between the coolant in the first flow path 91 and the coolant in the second flow path 92. The heat exchanger 9 provides heat exchange between two fluidically substantially independent systems 91 and 92. The heat exchanger 9 is also called a liquid heat exchanger or an intersystem heat exchanger. The battery heat exchanger 4 and the second pump 6 which pumps the coolant are installed on the second flow path 92. The battery heat exchanger 4 may be an internal or external heat exchanger used in conventional batteries, for example power battery panels of new energy vehicles. In the battery heating circuit of the thermal management and distribution control system, a second pump 6 is installed in such a manner that an outlet side faces downwardly on a surface of the drawing. The battery heat exchanger 4 is installed closer to a side of an outlet port of the second pump 6 than a side of an inlet port of the second pump 6. An independent relationship between the first flow path 91 and the second flow path 92 enables independent circulation flow rate adjustment in each. The first flow path 91 and the second flow path 92 can share ancillary devices such as a cooling liquid reserve system. The first flow path 91 and the second flow path 92 satisfy independence in this disclosure in that their respective flow rates can be adjusted independently without influencing each other.

When the second pump 6 is activated, the coolant circulates in the second flow path 92 in a counterclockwise direction. If there is a temperature difference between the coolant flowing the first flow path 91 and the second flow path 92, the heat exchanger 9 transfers a heat quantity from a high temperature side to a low temperature side. If the battery is at a low temperature, the coolant flowing through the second flow path 92 after heat exchange radiates heat to the battery by the battery heat exchanger 4. Further, on the battery heating circuit, a second temperature sensor 8 is further installed on a side of an inlet port of the battery heat exchanger 4 (on a side of an outlet port of the second pump 6). The second temperature sensor 8 is used to detect a temperature of the coolant flowing into the battery heat exchanger 4. The second temperature sensor 8 is connected to the control unit 500 and provides a detection signal.

The thermal management and distribution control system further includes a three-way flow control valve 5 installed on at least one arbitrary connection node between the first flow path 91 and the cabin heating circuit. Depending on arrangement positions, the three-way flow control valve 5 may be arranged with an arrange having one inlet port and two outlet ports, or an arrangement having two inlet ports and one outlet port. In this embodiment, the three-way flow control valve 5 is installed near the downstream side of the first pump 1. The three-way flow control valve 5 has a first valve port 51 connected to a side of the outlet port of the heat source 2, a second valve port 52 connected to a side of the inlet port of the heater core 3, and a third valve port 53 connected to the first flow path 91.

The three-way flow control valve 5 can be continuously adjusted between two fully open states through an intermediate state based on a control signal. The control signal is given from the control unit 500. Specifically, in a cabin only heating mode, the first valve port 51 and the second valve port 52 communicate with each other, and the third valve port 53 is blocked. In a battery only heating mode, the first valve port 51 and the third valve port 53 communicate with each other, and the second valve port 52 is blocked. In a simultaneous heating mode in which the cabin and the battery are heated simultaneously, the first valve port 51 and the second valve port 52 communicate with the third valve port 53 at the same time. In this mode, the opening degree during simultaneous communication, that is, the size of the opening degrees on both sides, may be changed based on the control signal. The flow rate of the coolant flowing into the heater core 3 and the flow rate of the coolant in the first flow path 91 can be adjusted by adjusting an opening degree of the second valve port 52 and an opening degree of the third valve port 53 of the three-way flow control valve 5. The opening degree of the second valve port 52 may hereinafter be referred to as a "heater core side opening degree." The opening degree of the third valve port 53 may hereinafter be referred to as a "first flow path side opening degree." The three-way flow control valve 5 is operable to adjust a distribution ratio of the coolant from the heat source 2 to the cabin heating circuit and to the battery heating circuit.

As shown in FIG. 1, if the first pump 1 and the second pump 6 are operated stably, the coolant pumped from the first pump 1 having a flow rate of Gw1 is heated by the heat source 2. The coolant branches at a portion of the three-way flow control valve 5. The coolant having a flow rate Gw2, which is a part of the pump flow rate, flows into the heater core 3 from the second valve port 52 of the three-way flow rate control valve 5. The coolant having a flow rate Gw2 radiates heat through the heater core 3 and heats the cabin. The coolant having a flow rate Gw3, which is another part of the pump flow rate, flows from the third valve port 53 of the three-way flow control valve 5 toward the first flow path 91. The coolant having a flow rate Gw3 exchanges heat with the coolant flowing through the second flow path 92 in the heat exchanger 9. As a result, the temperature of the coolant in the second flow path 92 increases. The coolant in the first flow path 91 flows through the first flow path 91 after the heat exchanger 9, and returns to the cabin heating circuit via another connection node of the cabin heating circuit. After the temperature has increased, the coolant in the second flow path 92 circulates in a counterclockwise direction under the pumping action of the second pump 6. The coolant in the second flow path 92 performs heat exchange with the battery in the battery heat exchanger 4. In one example, the battery heat exchanger 4 provides heating of the battery. In this way, the thermal management and distribution control system is possible to realize different water temperatures necessary for heating the cabin and heating the battery by distributing cooling fluids with different temperatures to the heater core 3 and the battery heat exchanger 4.

Control of Heat Quantity Distribution

Assume that the thermal management and distribution control system heats the cabin and raises a temperature of the battery. In this case, it is ideal for the heater core 3 and the battery heat exchanger 4 are operated at their respective target operating temperatures. However, in an actual operating process, a situation may arise in which actual operating temperatures of the heater core 3 and the battery heat exchanger 4 are far from the target operating temperatures. Therefore, in addition to the above-mentioned flow paths and the members provided on each one of the flow paths, the thermal management and distribution control system further includes a control unit 500. The control unit 500 performs an output control of the heat source 2, an opening degree control of the three-way flow control valve 5, and a rotational speed control of the first pump 1 and the second pump 6 for the thermal management and distribution control system. The control unit 500 is used to perform a heat quantity distribution control including a setting control of each temperature threshold value and the like described later. The control unit 500 includes at least one processor that performs the control processing described in this disclosure. The control unit 500 may be a microcomputer having a memory such as a ROM or a RAM, and a CPU, and the CPU executes a program stored in the ROM. Alternatively, the control unit 500 may include a processor that executes a program by a fixed electrical circuitry, such as a gate array.

In this disclosure, if the inside of the cabin and the battery are heated simultaneously, the control unit 500 rationally distributes heat supplied from the heat source 2 to the air conditioning side and the battery side. The control unit 500 controls the output of the heat source 2, the opening degree of the three-way flow control valve 5, and the rotational speed of the first pump 1 as control targets so as to realize rational distribution.

If the heat quantity distribution control is performed, the control unit 500 presets a heater core inlet temperature threshold value for the heater core 3 in advance. The heater core inlet temperature threshold is typically a temperature of the coolant at the heater core inlet that allows the heater core 3 to be operated under the target operating temperature. The control unit 500 determines whether the heater core 3 is at the target operating temperature by comparing the heater core inlet temperature threshold with the temperature of the coolant on the heater core 3 inlet side detected by the first temperature sensor 7. The control unit may determine whether the heat quantity distributed to the cabin side is sufficient based on a temperature comparison regarding the heater core 3.

Similarly, if the heat quantity distribution control is performed, the control unit 500 also presets a battery inlet temperature threshold value for the battery heat exchanger 4 in advance. The battery inlet temperature threshold is typically a temperature of the coolant at the battery heat exchanger inlet that allows the battery heat exchanger 4 to be operated under the target operating temperature. The control unit 500 determines whether the battery heat exchanger 4 is at the target operating temperature by comparing the battery inlet temperature threshold and a temperature of the coolant on the inlet side of the battery heat exchanger 4 detected by the second temperature sensor 8. The control unit may determine whether the heat quantity distributed to the battery side is sufficient based on a temperature comparison regarding the battery heat exchanger 4.

Due to reasons such as the temperature of the external environment, the heat source 2 does not always operate at maximum output power. Therefore, for example, if the detected value of the first temperature sensor 7 is lower than the heater core inlet temperature threshold, the control unit 500 compares a current operating power of the heat source 2 with the maximum output power. If the operating power of the heat source 2 is lower than the maximum output power, the control unit increases the output power of the heat source 2 to raise the detected value of the first temperature sensor 7 to the heater core inlet temperature threshold. In other words, air conditioning heating in the cabin is realized by increasing the output power of the heat source 2. On the other hand, if the heat source 2 is already operating at the maximum output power at that time, the control unit adopts other control methods to adjust the heat quantity distribution within the thermal management and distribution control system. The specific contents is described later.

The control unit 500 also regulates the heat quantity distribution within the thermal management and distribution control system by regulating the opening degree of the three-way flow control valve 5 in addition to regulating the heat source 2. For example, the control unit 500 may adjust the opening degree of the three-way flow control valve 5 (i.e., the opening degree of the second valve port 52 and the opening degree of the third valve port 53) according to the heating demand of the battery. The control unit 500 is thereby able to change a distribution ratio of the high temperature coolant of the heat source 2 to the heater core 3 and to the battery heat exchanger 4. Specifically, the control unit 500 may determine whether the demand for battery heating is too large or too small by comparing the detected value of the second temperature sensor 8 with the battery inlet temperature threshold. The control unit 500 may also determine whether a battery heating demand is increasing or decreasing by comparing a current battery heating amount target value with a battery heating amount target value a little earlier.

Specifically, the control unit 500 compares the detection value of the second temperature sensor 8 with the battery inlet temperature threshold which is preset in advance as described above. The control unit 500 controls the opening degree of the second valve port 52 and the opening degree of the third valve port 53 of the three-way flow control valve 5 based on a difference between the detected value of the second temperature sensor 8 and the battery inlet temperature threshold preset in advance. If the detected value of the second temperature sensor 8 is lower than the battery inlet temperature threshold, the control unit 500 executes the control process (1) below.

(1) Adjust the opening degree of the third valve port of the three-way flow control valve 5 in an increasing direction, i.e., in an opening direction, and adjust the opening degree of the second valve port of the three-way flow control valve 5 in a decreasing direction, i.e., in a closing direction, so as to increase the flow rate of the coolant in the first flow path 91 and reduce the flow rate of the coolant flowing into the heater core 3. As a result, the heating performance for the battery is improved. Contrary, if the detected value of the second temperature sensor 8 is higher than the battery inlet temperature threshold, the control unit 500 executes the control process (2) below.

(2) Adjust the opening degree of the third valve port of the three-way flow control valve 5 in a decreasing direction, i.e., in a closing direction, and adjust the opening degree of the second valve port of the three-way flow control valve 5 in an increasing direction, i.e., in an opening direction, so as to reduce the flow rate of the coolant in the first flow path 91 and increase the flow rate of the coolant flowing into the heater core 3. As a result, the heating amount to the battery is reduced.

However, in the adjustment method based on the detected value of the second temperature sensor 8 described above, even if the coolant flow rate on one side of the heat exchanger 9 is adjusted, it is possible to adjust the heating amount of the cabin and battery only within a relatively small range. In addition, in the process of making the above adjustment, simply adjusting the opening degree of the three-way flow control valve 5 may cause an air outlet temperature in the cabin to become uneven and fluctuate, resulting in adversely worsening of comfort in the cabin. Therefore, in the heat management and distribution control system of this disclosure, the first pump 1 and the second pump 6 are pumps whose rotational speeds can be adjusted. In other words, both the first pump 1 and the second pump 6 are pumps whose flow rates can be adjusted. If the inside of the cabin and the battery are heated at the same time, the control unit 500 not only adjusts the opening degree of the three-way flow control valve 5 described above, but also controls the output of the first pump 1 and the output of the second pump 6 by a first adjustment module and/or the second adjustment module. Thereby, the control unit 500 adjusts the amount of heat exchange between the first flow path 91 and the second flow path 92. The control unit 500 simultaneously achieves a precise distribution of the heat quantity required for both a cabin heating and a battery heating over a wide range. The control unit 500 simultaneously achieves the different water temperatures required for cabin heating and battery heating. A wide range indicates, for example, a wide temperature range. For example, the wide range may be indicated by a temperature range of the coolant in the second flow path 92.

(First Adjustment Module)

The first adjustment module is an adjusting module that ensures a stable heating effect in the cabin by adjusting the output of the first pump 1 and cooperatively operates both the first pump 1 and the three-way flow control valve 5. Specifically, the first adjustment module is provided by a control process of the control unit 500. The first adjustment module increases the rotational speed of the first pump 1 if the flow rate flowing into the heater core 3 is lower than a predetermined value. The first adjustment module decreases the rotational speed of the first pump 1 if the flow rate flowing into the heater core 3 is higher than a predetermined value.

Specifically, the control unit 500, as the first adjustment module, sets a lower limit threshold and an upper limit threshold for the flow rate of the coolant flowing out from the second valve port 52 of the three-way flow control valve 5. That is, the control unit 500 presets the first heater core flow rate lower limit threshold X1 and the first heater core flow rate upper limit threshold X2 for the flow rate of the coolant flowing into the heater core 3 in advance.

The control unit 500 calculates the main flow amount Gw1 of the coolant flowing into the heat source 2 based on the rotational speed of the first pump 1. The rotational speed of the first pump 1 is also obtained directly or indirectly from other electrical control variables representing the operating state of the pump, such as the PWM duty ratio. Thereafter, the control unit 500 calculates a coolant flow rate Gw2 flowing into the heater core 3 and the coolant flow rate Gw3 flowing into the first flow path 91 based on the coolant main flow rate Gw1 and the opening degree of the three-way flow control valve 5 at that time. The control unit 500 calculates the coolant flow rate (real-time flow rate) Gw2 flowing into the heater core 3. Then, the control unit 500 performs comparing the coolant flow rate Gw2 and a preset value of the first heater core flow rate lower limit threshold X1 or the first heater core flow rate upper limit threshold X2.

If it is necessary to increase the battery heating amount, the control unit 500 increases the opening degree on a side of the first flow path of the three-way flow control valve 5 and decreases the opening degree on a side of the heater core of the three-way flow control valve 5, i.e., the opening degree of the second valve port 52, based on the above mentioned control logic. As a result, the high temperature coolant flow rate Gw2 flowing into the heater core 3 decreases. In this process, if it is detected that the coolant flow rate Gw2 flowing into the heater core 3 is lower than the first heater core flow rate lower limit threshold X1, this means that the coolant flow rate in the heater core 3 is too small. At this time, the control unit 500 issues a command to increase the rotational speed of the first pump 1 to appropriately increase the coolant flow rate Gw2. As a result, the coolant flow rate Gw2 is maintained within a certain range. Here, the certain range is, for example, a flow rate necessary to satisfy the heating demand of the cabin, and a range that does not cause large fluctuations in the cabin heating amount.

If it is necessary to increase the battery heating amount, the control unit 500 decreases the opening degree on a side of the first flow path of the three-way flow control valve 5 and increases the opening degree on a side of the heater core of the three-way flow control valve 5, i.e., the opening degree of the second valve port 52, based on the above mentioned control logic. As a result, the high temperature coolant flow rate Gw2 flowing into the heater core 3 increases. In this process, if it is detected that the coolant flow rate Gw2 flowing into the heater core 3 is higher than the first heater core flow rate upper limit threshold X2, this means that the coolant flow rate in the heater core 3 is too much. At this time, the control unit 500 issues a command to appropriately reduce the coolant flow rate Gw2 by lowering the rotational speed of the first pump 1. As a result, the coolant flow rate Gw2 is maintained within a certain range. Here, the certain range is, for example, a flow rate necessary to satisfy the heating demand of the cabin, and a range that does not cause large fluctuations in the cabin heating amount.

The control unit 500, as the first adjustment module, may preset a first opening degree upper limit threshold Y1 for a side of the first flow path and a first opening degree lower limit threshold Y2 for a side of the first flow path for the opening degree on a side of the first flow path of the three-way flow control valve 5, that is, the opening degree of the third valve port in advance. The control unit 500 may compare the opening degree on a side of the first flow path of the three-way flow control valve 5 with a preset value of the first opening degree upper limit threshold Y1 for a side of the first flow path or the first opening degree lower limit threshold Y2 for a side of the first flow path. The opening degree on a side of the first flow path may be provided by a real-time opening degree.

Similarly, if it is necessary to increase the battery heating amount, the control unit 500 increases the opening degree on a side of the first flow path of the three-way flow control valve 5 and decreases the opening degree on a side of the heater core of the three-way flow control valve 5 based on the above mentioned control logic. As a result, the high temperature coolant flow rate Gw2 flowing into the heater core 3 is decreased. In this process, if it is detected that the opening degree on a side of the first flow path is higher than the first opening degree upper limit threshold Y1 for a side of the first flow path, this means that the flow rate of the coolant in the heater core 3 is too small. At this time, the control unit 500 issues a command to increase the rotational speed of the first pump 1 to appropriately increase the coolant flow rate Gw2. As a result, the coolant flow rate Gw2 is maintained within a certain range. Here, the certain range is, for example, a flow rate necessary to satisfy the heating demand of the cabin, and a range that does not cause large fluctuations in the cabin heating amount.

If it is necessary to decrease the battery heating amount, the control unit 500 decreases the opening degree on a side of the first flow path of the three-way flow control valve 5 and increases the opening degree on a side of the heater core of the three-way flow control valve 5 based on the above mentioned control logic. As a result, the high temperature coolant flow rate Gw2 flowing into the heater core 3 is increased. In this process, if it is detected that the opening degree on a side of the first flow path is lower than the first opening degree lower limit threshold Y2 for a side of the first flow path, this means that the flow rate of the coolant in the heater core 3 is too much. At this time, the control unit 500 issues a command to appropriately reduce the coolant flow rate Gw2 by lowering the rotational speed of the first pump 1. As a result, the coolant flow rate Gw2 is maintained within a certain range. Here, the certain range is, for example, a flow rate necessary to satisfy the heating demand of the cabin, and a range that does not cause large fluctuations in the cabin heating amount.

In this way, since the coolant flow rate Gw2 flowing into the heater core 3 is maintained within a certain range by adjusting the rotational speed of the first pump 1, it is possible to ensure the minimum flow rate of the coolant flowing into the heater core 3. As a result, the device and the method disclosed in this disclosure further stabilizes cabin heating and guarantees passenger comfort. The device and the method prevents problems such as unevenness in the air outlet temperature, fluctuations in the air outlet temperature, and deterioration of cabin comfort. If the coolant flow rate Gw2 flowing into the heater core 3 is between the first heater core flow rate lower limit threshold X1 and the first heater core flow rate upper limit threshold X2, or the opening degree on a side of the first flow path of the three-way flow control valve 5 is between the first opening degree upper limit threshold Y1 for a side of the first flow path and the first opening degree lower limit threshold Y2 for a side of the first flow path, the rotational speed of the first pump 1 is not adjusted.

(Second Adjustment Module)

As described above, the control unit 500 compares the detected value of the second temperature sensor 8 with the above-mentioned preset value of the battery inlet temperature threshold, and thereby determines the battery heating demand. In addition, the control unit 500 performs adjustment based on the detected value of the second temperature sensor 8 regarding the opening degree of the three-way flow control valve 5. However, in the above mentioned adjustment based on the detected value of the second temperature sensor 8, if the opening degree of the third valve port 53 of the three-way flow control valve 5 is relatively large, it is difficult to effectively increase an amount of heat supplied from the coolant in the second flow path 92 even if the third valve port 53 is further adjusted in the opening direction. If the opening degree of the third valve port 53 of the three-way flow control valve 5 is minute, the temperature of the coolant in the thermal management and distribution control system may be adversely fluctuate significantly in response to adjusting the opening degree of the three-way flow control valve 5. Thus, in this disclosure, the control unit further includes a second adjustment module.

The second adjustment module is an adjustment module that adjusts the heat exchange amount of the heat exchanger 9 by adjusting the output of the second pump 6 and cooperatively operates both the second pump 6 and the three-way flow control valve 5. Specifically, the second adjustment module is provided by a control process of the control unit 500. The second adjustment module increases the rotational speed of the second pump 6 if the battery heating amount must be increased. The second adjustment module decreases the rotational speed of the second pump 6 if the battery heating amount must be reduced.

It is assumed that the opening degree of the third valve port 53 of the three-way flow control valve 5 is relatively large and the demand for battery heating continues to increase at this time. In this case, due to the characteristics of the heat exchanger 9, even if the opening degree of the third valve port 53 is continued to be increased and the coolant flow rate Gw3 in the first flow path 91 of the heat exchanger 9 is increased, it may be impossible to effectively increase the amount of heat released to the coolant in the second flow path 92. At this time, the three-way flow control valve 5 has lost its function of controlling the distribution of heat quantity. Therefore, it is necessary to adjust the heat exchange amount by changing the flow rate of the coolant in the second flow path 92.

More specifically, the first flow path 91 and the second flow path 92 are separated by a heat exchange plate provided inside the heat exchanger 9, and heat exchange is performed via this heat exchange plate. Since a heat storage capacity of a heat exchange plate is limited, even if the coolant flow rate on a left side of the heat exchange plate is subsequently increased after the coolant flow rate Gw3 in the first flow path 91 is increased to a certain extent, it is difficult to transfer more heat quantity through the heat exchange plate. On the other hand, if the flow rate of the coolant on a right side of the heat exchange plate is adjusted within a certain range, i.e., the flow rate of the coolant in the second flow path 92 is changed, it is possible to transfer more heat quantity from the heat exchanger plate in a predetermined time period to the coolant in the second flow path 92. As a result, it is possible to transfer more heat quantity to the battery by the battery heat exchanger 4.

On the other hand, the control unit 500, as the second adjustment module, presets a flow rate upper limit threshold X3 for the first flow path in advance for the flow rate of the coolant flowing out from the third valve port 53 of the three-way flow control valve 5, i.e., the flow rate of flowing into the first flow path 91. Similarly, the control unit 500 calculates the main coolant flow rate Gw1 flowing into the heat source 2 based on the rotational speed of the first pump 1. Then, the control unit 500 achieves and calculates the coolant flow rate Gw3 flowing into the first flow path 91 based on the main coolant flow rate Gw1 of the coolant and the opening degree of the three-way flow control valve 5 at that time. The control unit 500 compares the coolant flow rate Gw3 with a preset value of the flow rate upper limit threshold X3 for the first flow path after calculating the coolant flow rate Gw3 flowing into the first flow path 91. Alternatively, the control unit 500 may preset an opening degree for a side of the first flow path of the three-way flow control valve 5 in advance. That is, the control unit 500 may preset a second opening degree upper limit threshold Y3 for a side of the first flow path in advance. Then, the control unit 500 may compare the opening degree for a side of the first flow path of the three-way flow control valve 5 with the second opening degree upper limit threshold Y3 for a side of the first flow path in advance. The flow rate upper limit threshold X3 for the first flow path or the second opening degree upper limit threshold Y3 for a side of the first flow path can be obtained by experiment. Specifically, the control unit 500 monitors a changing rate of the heat quantity transferred to a side of the battery, as the control unit 500 adjusts the opening degree of the third valve port 53 of the three-way flow control valve 5. The control unit 500 acquires a first channel flow rate value at a time when the changing rate of the heat quantity transferred to a side of the battery is gradually decreased and the changing rate lowers a predetermined fixed value. The control unit 500 sets the acquired flow rate in the first flow path as the flow rate upper limit threshold X3 for the first flow path. Alternatively, if the changing rate decreases to a certain value, the control unit 500 may acquire a value of the opening degree for a side of the first flow path at this time and sets the acquired value as the second opening degree upper limit threshold Y3 for a side of the first flow path.

Assume that it is detected that either the coolant flow rate Gw3 flowing into the first flow path 91 is higher than the flow rate upper limit threshold X3 for the first flow path, or the opening degree for a side of the first flow path of the three-way flow control valve 5 exceeds the second opening degree upper limit threshold Y3 for a side of the first flow path. In this case, it means that the opening degree of the third valve port 54 has already reached such a degree that it is difficult to satisfy the battery heating amount even if the third valve port 54 is continuously increased. At this time, the control unit 500 determines the battery heating demand and controls the output of the second pump 6 based on the battery heating demand.

Specifically, if the detected value of the second temperature sensor 8 is lower than a preset battery inlet temperature threshold, i.e., if the battery heating demand increases, the control unit 500 controls the three-way flow control valve 5 to maintain the opening degree for a side of the first flow and controls the second pump 6 to increase the rotational speed. As a result, the amount of heat exchanged in a portion of the heat exchanger 9 increases to satisfy an increased amount of the battery heating demand. If the detected value of the second temperature sensor 8 is higher than a preset battery inlet temperature threshold, i.e., if the battery heating demand decreases, the control unit 500 controls the three-way flow control valve 5 to maintain the opening degree for a side of the first flow and controls the second pump 6 to decrease the rotational speed. As a result, the amount of heat exchanged in the heat exchanger 9 is reduced.

On the other hand, if the opening degree of the third valve port 53 of the three-way flow rate control valve 5 is minute, or if the flow rate Gw3 in the first flow path 91 is relatively small, a change of the battery heating demand may be assumed to occur. In this case, due to characteristics of the heat exchanger 9, if the opening degree of the three-way flow control valve 5 is changed, the amount of heat exchanged on the heat exchanger 9 changes rapidly. As a result, the temperature of the coolant in each part of the system is expected to vary significantly. An example of a state where the flow rate GW3 is relatively small is a state where the flow rate is smaller than a predetermined threshold flow rate, for example, a state where it is smaller than 1 L/min. At this time, the three-way flow control valve 5 has lost its function of controlling the distribution of heat quantity. Therefore, it is necessary to adjust the heat exchange amount by changing the flow rate of the coolant in the second flow path 92.

On the other hand, the control unit 500, as the second adjustment module, sets a flow rate lower limit threshold X4 for the first flow path in advance for the flow rate of the coolant flowing out from the third valve port 53 of the three-way flow control valve 5, that is, the flow rate of flowing into the first passage 91. The control unit 500 compares the calculated coolant flow rate Gw3 with a preset value of the flow rate lower limit threshold X4 for the first flow path. Alternatively, the control unit 500 may preset a second opening degree lower limit threshold Y4 for a side of the first flow path in advance with respect to an opening degree for the first flow path of the three-way flow control valve 5, i.e., the opening degree of the third valve opening. The control unit 500 compares the opening degree for a side of the first flow path of the three-way flow control valve 5 with a preset second opening degree lower limit threshold Y4 for a side of the first flow path. At the same time, the control unit 500 further predefines a battery heating demand threshold Z. The control unit 500 then compares the battery heating demand threshold Z with a changing range in the battery heating demand. Thereby, the control unit 500 accurately performs distribution of an amount of heat supplied from the heat source within a predetermined variation range of battery heating demand. A changing range in the battery heating demand refers to an absolute value of a difference between the detection value of the second temperature sensor 8 and a preset battery inlet temperature threshold.

Specifically, it may be possible to assume that the coolant flow rate Gw3 flowing into the first flow path 91 is lower than the flow rate lower limit threshold X4 for the first flow path, or the opening degree for a side of the first flow path of the three-way flow control valve 5 is lower than the second opening degree lower limit threshold Y4 for a side of the first flow path. In this situation, the battery heating demand may increase and the changing range may be lower than the battery heating demand threshold Z described above. In this case, it means that the coolant temperature in the second flow path 92 must be precisely increased within a certain range to satisfy an increased amount of the battery heating demand. At this time, the control unit 500 maintains the opening degree of the three-way flow control valve 5 on a side of the first flow path unchanged and increases the rotational speed of the second pump 6. Increasing of the battery heating demand is a situation where the detected value of the second temperature sensor 8 is lower than the battery inlet temperature threshold. The changing range is an absolute value of a difference between the detection value of the second temperature sensor 8 and the battery inlet temperature threshold.

In this situation, the battery heating demand may be decreased and the changing range may be lower than the battery heating demand threshold Z described above. In this case, it means that the coolant temperature in the second flow path 92 must be precisely lowered within a certain range to satisfy a reduced amount of the battery heating demand. At this time, the control unit 500 maintains the opening degree of the three-way flow control valve 5 on a side of the first flow path unchanged and reduces the rotational speed of the second pump 6. Decreasing of the battery heating demand is a situation where the detected value of the second temperature sensor 8 is higher than the battery inlet temperature threshold.

In this way, if the coolant flow rate flowing into the battery heat exchanger 4 by changing the rotational speed of the second pump 6, it is possible to accurately adjust the heat exchange amount of the heat exchanger 9 within a certain range. A certain range may be defined depending on a thermal responsiveness of the heat exchanger 9. The certain range depends on the response characteristic of the change in the battery heating amount with respect to the change in the coolant flow rate Gw3. The certain range is a range in which it is possible to change the battery heating amount without changing the coolant flow rate Gw3. Thereby, it is possible to satisfy the battery heating demand without significantly changing the coolant temperature of each part of the system, and it is possible to achieve the target heat quantity on a side of the battery. The above adjustment module can compensate a delay, which is caused by necessitating a certain period of time until an actual heating amount reaching a target heating amount when the heating amount demand changes.

(Other Adjustment Module)

In the embodiment described above, the opening degree of the three-way flow control valve 5 is adjusted by feedback control. The feedback control is a feedback control that is able to continuously change an output based on the detected value of the second temperature sensor. In this embodiment, the rotational speed of the second pump 6 is adjusted in a situation where the three-way flow control valve 5 is feedback-controlled. Thus, the adjustment module provide a cooperative operation of the three-way flow control valve 5 and the second pump 6.

Instead of this embodiment, the opening degree of the three-way flow control valve 5 may be adjusted by a feedforward control in a non-linear and changeable manner.

Specifically, the control unit is capable of selectively setting a plurality of preset opening degree levels for the three-way flow control valve 5 according to a required amount of battery heating demand and a required amount of cabin heating demand. The plurality of preset opening degree levels correspond to the first flow path side opening degree level of the three-way flow rate control valve 5 in the preceding embodiment. If the battery heating demand is relatively large and the cabin heating demand is relatively small, the first flow path side opening degree of the three-way flow control valve 5 is set to a relatively large preset opening degree level. If the battery heating demand is relatively small and the cabin heating demand is relatively large, the first flow path side opening degree of the three-way flow control valve 5 is set to a relatively small preset opening degree level. Although the heating amount demand is fluctuate, if the changing range does not exceed a level for that time, the opening degree of the three-way flow control valve 5 is not adjusted. However, as mentioned above, the heat exchange amount of the heat exchanger 9 can be precisely adjusted within a certain range to satisfy changes in the heating amount demand by adjusting the output of the second pump 6. These control processes are executed by the control unit 500. Also in this embodiment, a linear corporative control of the three-way flow control valve 5 and the second pump 6 is provided by the control unit 500. Thereby, the thermal management and distribution control system can realize operation in a wider range of heating capacity distribution ratios and adjust the heating capacity more accurately.

In addition to the adjustment modules described above, the thermal management and distribution system of this disclosure may use the first adjustment module and the second adjustment module described above simultaneously in a combined manner. As a result, it is possible to satisfy various heating demands for the cabin and the battery by pursuing comfort in the cabin heating and performing an accurate distribution of an amount of heat supplied from the heat source over a wide range.

In addition, according to this disclosure, the control unit of the thermal management and distribution control system can further calculate an amount of heat supplied from the heater core 3 and compare it with a preset threshold value of an amount of heat supplied from the heater core. Alternatively, the control unit of the thermal management and distribution control system can also calculate an amount of heat supplied from the battery heat exchanger 4 and compare it with a preset threshold value of an amount of heat supplied from the battery heat exchanger. Thereby, it is possible to realize an adjustment of the opening degree of the three-way flow control valve 5 and a simultaneous heating of the cabin and the battery by using the first adjustment module and/or the second adjustment module.

Figure 2:
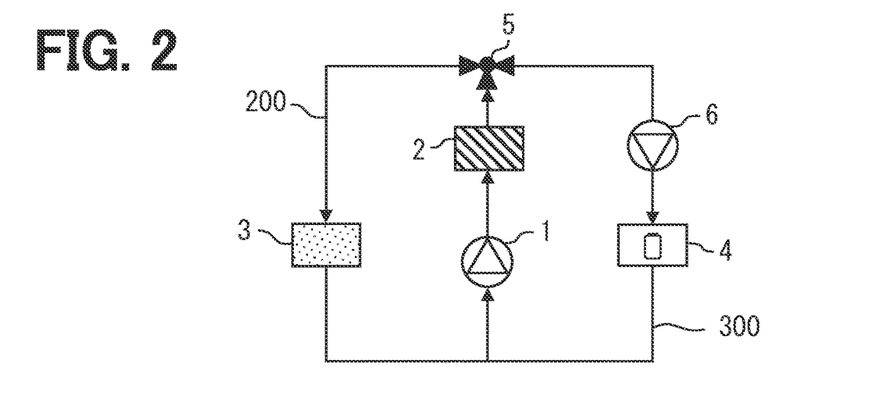
FIG. 2 is a schematic circuit diagram of a comparative example of a thermal management and distribution control system.

FIG. 2 is a schematic circuit diagram of a comparative example of a thermal management and distribution control system. As shown in FIG. 2, a heat source 2 and a heater core 3 are installed on the cabin heating circuit 200. The battery heat exchanger 4 is installed on the battery heating circuit 300. The cabin heating circuit 200 and the battery heating circuit 300 are integrally connected in parallel by using the three-way flow control valve 5. It is possible to realize simultaneous heating of the cabin and the battery by performing flow rate distribution by the three-way flow control valve 5. However, since the coolant entering the heater core 3 and the battery heat exchanger 4 both come from the heat source outlet, water temperatures in the cabin heating circuit 200 and the battery heating circuit 300 are always the same. In reality, the water temperature required to heat the cabin is even higher (50 Celsius Degrees to 70 Celsius Degrees), but for safety reasons the battery cannot accept direct heating by the coolant in such hot temperature. Therefore, if heating the cabin and the battery at the same time using the thermal management and distribution control system shown in FIG. 2, there are very large limitations. Furthermore, if a portion of the coolant at the heat source outlet is distributed to the battery side, the flow rate of the coolant flowing into the heater core 3 is reduced. In this case, a blown-out temperature into the cabin becomes non-uniform, the blown-out temperature fluctuates, and the comfort inside the cabin deteriorates.

Figure 3:
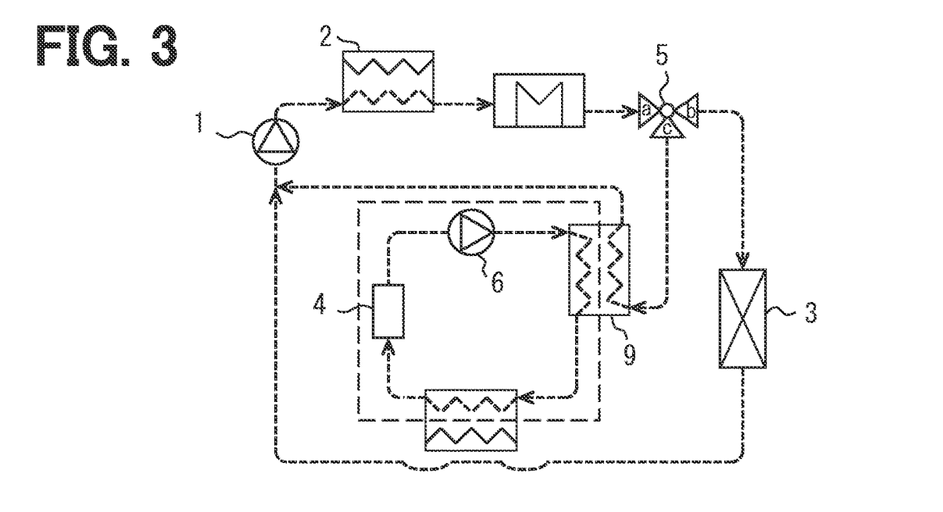
FIG. 3 is a schematic circuit diagram of another comparative example of a thermal management and distribution control system.

FIG. 3 is a circuit schematic diagram of another thermal management and distribution control system. As shown in FIG. 3, instead of introducing the hot water at the outlet of the heat source 2 directly into the battery heat exchanger 4, the heat exchange between the cabin heating circuit and the battery heating circuit is carried out through a single component of the heat exchanger 9. The heating amount on a side of the battery is adjusted by changing the flow rate of water passing through a side of the heat exchanger 9 by adjusting the opening degree of the three-way flow control valve 5. However, the heat exchange capacity of the heat exchanger 9 is simultaneously influenced by the flow rates of the two flow paths. Therefore, the heating amount of the cabin and the battery is only able to change within a small range by simply adjusting a water flow rate on one side. This makes it impossible to cope with the complex external environment and the wide variety of usage scenes that occur in the actual use of current new energy vehicles. At the same time, the comparative example shown in FIG. 3 cannot solve the above-mentioned problem of deterioration of comfort in the cabin caused by a decrease in the flow rate of the heater core 3 during battery heating.

This specification discloses a thermal management and distribution system as described below. The thermal management and distribution control system includes a cabin heating circuit, a battery heating circuit, and a control unit 500. The cabin heating circuit includes a first pump, a heat source, and a heater core. The first pump 1, the heat source 2, and the heater core 3 form a main circulation circuit. The cabin heating circuit and the battery heating circuit are arranged fluidly in parallel with respect to the first pump 1. A parallel relationship is provided by two branch points. One branch point is provided by a three-way flow control valve 5. The one remaining branch point is provided by a merging pipe. The battery heating circuit includes the first flow path 91 that branches off from the cabin heating circuit at the three-way flow control valve. The first flow path 91 provides a bypass circuit that does not go through the heater core 3 but goes through the heat exchanger 9 with respect to the main circulation circuit. The battery heating circuit includes the second flow path 92 that is independent of the first flow path 91. The first flow path and the second flow path are thermally coupled by a heat exchanger. The second flow path includes the heat exchanger, a second pump, and a battery heat exchanger. The second flow path 92 forms a circulation circuit.

The control unit 500 adjusts an output of the heat source 2, an opening degree of the three-way flow control valve 5, an output of the first pump 1, and an output of the second pump 6. If the cabin and the battery are heated simultaneously, the control unit adjusts the output of the first pump and/or the output of the second pump. If the cabin and the battery are heated at the same time, the control unit 500 controls the output of the first pump 1 and the opening degree of the three-way flow control valve 5 to meet the cabin heating demand and the battery heating demand. The control unit 500 controls the output of second pump 6 to meet the battery heating demand.

This disclosure discloses the following technical ideas 1 to 8 and combinations of those technical ideas.

(Technical Idea 1) A thermal management and distribution control system, comprising: a cabin heating circuit including a heat source, a first pump, and a heater core; a battery heating circuit including a first flow path, a second flow path, and a heat exchanger, the first flow path being connected to the cabin heating circuit via a three-way flow control valve in such a manner that the heat exchanger and the heater core are installed in parallel, the second pump and the battery heat exchanger being installed on the second flow path, the first flow path and the second flow path being independent of each other, and the heat exchanger performing heat exchange between a coolant in the first flow path and a coolant in the second flow path; and a control unit, including at least one processor, being configured to adjust an output of the heat source, an opening degree of the three-way flow rate control valve, an output of the first pump, and an output of the second pump, wherein the control unit is configured to adjust the output of the first pump and/or the output of the second pump, if a cabin and a battery are heated simultaneously.

(Technical Idea 2) The thermal management and distribution control system according to Technical Idea 1, wherein the cabin heating circuit includes a first temperature sensor disposed on a side of an inlet of the heater core, and wherein the control unit is configured to adjust an output of the heat source based on a detected value of the first temperature sensor.

(Technical Idea 3) The thermal management and distribution control system according to Technical Idea 2, wherein the second flow path includes a second temperature sensor disposed on a side of an inlet of the battery heat exchanger, and wherein the control unit is configured to adjust an opening degree of the three-way flow control valve based on a detected value of the second temperature sensor.

(Technical Idea 4) The thermal management and distribution control system according to Technical Idea 3, wherein the control unit is configured to calculate a coolant flow rate flowing into the heater core, and wherein the control unit is configured to compare a calculated value of the coolant flow rate with a preset value of a first heater core flow rate upper limit threshold or a preset value of a first heater core flow rate lower limit threshold, or compare an opening degree for a side of the first flow path of the three-way flow control valve with a preset value of a first opening degree upper limit threshold for a side of the first flow path or a preset value of a first opening degree lower limit threshold for a side of the first flow path, and wherein the control unit is configured to adjust a coolant flow rate flowing into the heater core by controlling an output of the first pump in such a manner that (i) the control unit is configured to, in the process of adjusting the opening degree on a side of the first flow path of the three-way flow control valve in an opening direction, increase the output of the first pump, if the coolant flow rate flowing into the heater core is lower than the first heater core flow rate lower limit threshold, or an opening degree on a side of the first flow path of the three-way flow control valve is higher than the first opening degree upper limit threshold for a side of the first flow path, or (ii) the control unit is configured to, in the process of adjusting the opening degree on a side of the first flow path of the three-way flow control valve in a closing direction, decrease the output of the first pump, if the coolant flow rate flowing into the heater core is higher than the first heater core flow rate upper limit threshold, or an opening degree on a side of the first flow path of the three-way flow control valve is lower than the first opening degree lower limit threshold for a side of the first flow path.

(Technical Idea 5) The thermal management and distribution control system according to Technical Idea 3, wherein the control unit is configured to compare a detected value of the second temperature sensor with a preset value of a battery inlet temperature threshold, and wherein the control unit is configured to adjust an opening degree of the three-way flow control valve in such a manner that (i) the control unit is configured to increase the coolant flowing into the first flow path by adjusting an opening degree on a side of the first flow path of the three-way flow control valve in an opening direction, if the detected value of the second temperature sensor is lower than the battery inlet temperature threshold, or (ii) the control unit is configured to decrease the coolant flowing into the first flow path by adjusting an opening degree on a side of the first flow path of the three-way flow control valve in a closing direction, if the detected value of the second temperature sensor is higher than the battery inlet temperature threshold.

(Technical Idea 6) The thermal management and distribution control system according to Technical Idea 5, wherein the control unit is configured to compare the opening degree on a side of the first flow path of the three-way flow control valve with a preset value of a second opening degree upper limit threshold on a side of the first flow path, or calculate a flow rate on the first flow path and compare a calculated value of the flow rate of the first flow path with a preset value of a flow rate upper limit threshold for the first flow path, and wherein the control unit is configured to, in a case that the opening degree on a side of the first flow path of the three-way flow control valve is higher than the second opening degree upper limit threshold on a side of the first flow path or the flow rate of the first flow path is higher than the flow rate upper limit threshold for the first flow path, adjust a coolant flow rate in the second flow path by controlling an output of the second pump in such a manner that (i) the control unit is configured to increase the output of the second pump and maintain the opening degree on a side of the first flow path of the three-way flow control valve unchanged, if the detected value of the second temperature sensor is lower than a preset value of the battery inlet temperature threshold, or (ii) the control unit is configured to decrease the output of the second pump and maintain the opening degree on a side of the first flow path of the three-way flow control valve unchanged, if the detected value of the second temperature sensor is higher than a preset value of the battery inlet temperature threshold.

(Technical idea 7) The thermal management and distribution control system according to Technical Idea 5, wherein the control unit is configured to compare the opening degree on a side of the first flow path of the three-way flow control valve with a preset value of a second opening degree lower limit threshold on a side of the first flow path, or calculate a flow rate on the first flow path and compare a calculated value of the flow rate of the first flow path with a preset value of a flow rate lower limit threshold for the first flow path, and wherein the control unit is configured to, in a case that the opening degree on a side of the first flow path of the three-way flow control valve is lower than the second opening degree lower limit threshold on a side of the first flow path or the flow rate of the first flow path is lower than the flow rate lower limit threshold for the first flow path, adjust a coolant flow rate in the second flow path by controlling an output of the second pump in such a manner that (i) the control unit is configured to increase the output of the second pump and maintain the opening degree on a side of the first flow path of the three-way flow control valve unchanged, if the detected value of the second temperature sensor is lower than a preset value of the battery inlet temperature threshold and an absolute value of a difference between the detected value of the second temperature sensor and the preset value of the battery inlet temperature threshold is lower than a set value of a battery heating demand threshold, or (ii) the control unit is configured to decrease the output of the second pump and maintain the opening degree on a side of the first flow path of the three-way flow control valve unchanged, if the detected value of the second temperature sensor is higher than a preset value of the battery inlet temperature threshold and an absolute value of a difference between the detected value of the second temperature sensor and the preset value of the battery inlet temperature threshold is lower than a set value of a battery heating demand threshold.

(Technical Idea 8) The thermal management and distribution control system according to Technical Idea 5, wherein the control unit is configured to set a plurality of preset levels of the opening degree for a side of the first flow path of the three-way flow control valve, and wherein the control unit is configured to set a relatively large preset level for the opening degree on a side of the first flow path of the three-way flow control valve, if a battery heating demand is relatively large and a cabin heating demand is relatively small, and wherein the control unit is configured to set a relatively small preset level for the opening degree on a side of the first flow path of the three-way flow control valve, if the battery heating demand is relatively small and the cabin heating demand is relatively large.

It should be understood that the above specific embodiments are more detailed descriptions of the objectives, technical methods, and beneficial effects of this disclosure, and the above are just a kind of specific embodiments of this disclosure and are not intended to limit protection scopes of this disclosure. This disclosure may be embodied in various forms without departing from its essential characteristics. In other words, the embodiments of this disclosure are intended to be illustrative, not limiting, and scopes of this disclosure are limited by the claims, not by the specification, and all variations in the scopes defined by the claims, or ranges equivalent thereof, are to be understood to be included in the claims. All modifications, equivalent substitutions, improvements, etc. made within the gist of this disclosure and its principles shall fall within the protection scope of this disclosure.

What is claimed is:

1. A thermal management and distribution control system, comprising:
    a cabin heating circuit including a heat source, a first pump, and a heater core;
    a battery heating circuit including a first flow path, a second flow path, and a heat exchanger, the first flow path being connected to the cabin heating circuit via a three-way flow control valve in such a manner that the heat exchanger and the heater core are installed in parallel, a second pump and a battery heat exchanger being installed on the second flow path, the first flow path and the second flow path being independent of each other, and the heat exchanger performing heat exchange between a coolant in the first flow path and a coolant in the second flow path; and a control unit, including at least one processor, being configured to adjust an output of the heat source, an opening degree of a three-way flow rate control valve, an output of the first pump, and an output of the second pump, wherein the control unit is configured to adjust the output of the first pump and/or the output of the second pump, if a cabin and a battery are heated simultaneously.

2. The thermal management and distribution control system according to claim 1, wherein the cabin heating circuit includes a first temperature sensor disposed on a side of an inlet of the heater core, and wherein the control unit is configured to adjust an output of the heat source based on a detected value of the first temperature sensor.

3. The thermal management and distribution control system according to claim 2, wherein the second flow path includes a second temperature sensor disposed on a side of an inlet of the battery heat exchanger, and wherein the control unit is configured to adjust an opening degree of the three-way flow control valve based on a detected value of the second temperature sensor.

4. The thermal management and distribution control system according to claim 3, wherein the control unit is configured to calculate a coolant flow rate flowing into the heater core, and wherein the control unit is configured to compare a calculated value of the coolant flow rate with a preset value of a first heater core flow rate upper limit threshold or a preset value of a first heater core flow rate lower limit threshold, or compare an opening degree for a side of the first flow path of the three-way flow control valve with a preset value of a first opening degree upper limit threshold for a side of the first flow path or a preset value of a first opening degree lower limit threshold for a side of the first flow path, and wherein the control unit is configured to adjust a coolant flow rate flowing into the heater core by controlling an output of the first pump in such a manner that:

(i) the control unit is configured to, in the process of adjusting the opening degree on a side of the first flow path of the three-way flow control valve in an opening direction, increase the output of the first pump, if the coolant flow rate flowing into the heater core is lower than the first heater core flow rate lower limit threshold, or an opening degree on a side of the first flow path of the three-way flow control valve is higher than the first opening degree upper limit threshold for a side of the first flow path; or (ii) the control unit is configured to, in the process of adjusting the opening degree on a side of the first flow path of the three-way flow control valve in a closing direction, decrease the output of the first pump, if the coolant flow rate flowing into the heater core is higher than the first heater core flow rate upper limit threshold, or an opening degree on a side of the first flow path of the three-way flow control valve is lower than the first opening degree lower limit threshold for a side of the first flow path.

5. The thermal management and distribution control system according to claim 3, wherein the control unit is configured to compare a detected value of the second temperature sensor with a preset value of a battery inlet temperature threshold, and wherein the control unit is configured to adjust an opening degree of the three-way flow control valve in such a manner that:

(i) the control unit is configured to increase the coolant flowing into the first flow path by adjusting an opening degree on a side of the first flow path of the three-way flow control valve in an opening direction, if the detected value of the second temperature sensor is lower than the battery inlet temperature threshold; or (ii) the control unit is configured to decrease the coolant flowing into the first flow path by adjusting an opening degree on a side of the first flow path of the three-way flow control valve in a closing direction, if the detected value of the second temperature sensor is higher than the battery inlet temperature threshold.

6. The thermal management and distribution control system according to claim 5, wherein the control unit is configured to compare the opening degree on a side of the first flow path of the three-way flow control valve with a preset value of a second opening degree upper limit threshold on a side of the first flow path, or calculate a flow rate on the first flow path and compare a calculated value of the flow rate of the first flow path with a preset value of a flow rate upper limit threshold for the first flow path, and wherein the control unit is configured to, in a case that the opening degree on a side of the first flow path of the three-way flow control valve is higher than the second opening degree upper limit threshold on a side of the first flow path or the flow rate of the first flow path is higher than the flow rate upper limit threshold for the first flow path, adjust a coolant flow rate in the second flow path by controlling an output of the second pump in such a manner that:

(i) the control unit is configured to increase the output of the second pump and maintain the opening degree on a side of the first flow path of the three-way flow control valve unchanged, if the detected value of the second temperature sensor is lower than a preset value of the battery inlet temperature threshold; or (ii) the control unit is configured to decrease the output of the second pump and maintain the opening degree on a side of the first flow path of the three-way flow control valve unchanged, if the detected value of the second temperature sensor is higher than a preset value of the battery inlet temperature threshold.

7. The thermal management and distribution control system according to claim 5, wherein the control unit is configured to compare the opening degree on a side of the first flow path of the three-way flow control valve with a preset value of a second opening degree lower limit threshold on a side of the first flow path, or calculate a flow rate on the first flow path and compare a calculated value of the flow rate of the first flow path with a preset value of a flow rate lower limit threshold for the first flow path, and wherein the control unit is configured to, in a case that the opening degree on a side of the first flow path of the three-way flow control valve is lower than the second opening degree lower limit threshold on a side of the first flow path or the flow rate of the first flow path is lower than the flow rate lower limit threshold for the first flow path, adjust a coolant flow rate in the second flow path by controlling an output of the second pump in such a manner that:

(i) the control unit is configured to increase the output of the second pump and maintain the opening degree on a side of the first flow path of the three-way flow control valve unchanged, if the detected value of the second temperature sensor is lower than a preset value of the battery inlet temperature threshold and an absolute value of a difference between the detected value of the second temperature sensor and the preset value of the battery inlet temperature threshold is lower than a set value of a battery heating demand threshold; or (ii) the control unit is configured to decrease the output of the second pump and maintain the opening degree on a side of the first flow path of the three-way flow control valve unchanged, if the detected value of the second temperature sensor is higher than a preset value of the battery inlet temperature threshold and an absolute value of a difference between the detected value of the second temperature sensor and the preset value of the battery inlet temperature threshold is lower than a set value of a battery heating demand threshold.

8. The thermal management and distribution control system according to claim 5, wherein the control unit is configured to set a plurality of preset levels of the opening degree for a side of the first flow path of the three-way flow control valve, and wherein the control unit is configured to set a relatively large preset level for the opening degree on a side of the first flow path of the three-way flow control valve, if a battery heating demand is relatively large and a cabin heating demand is relatively small, and wherein the control unit is configured to set a relatively small preset level for the opening degree on a side of the first flow path of the three-way flow control valve, if the battery heating demand is relatively small and the cabin heating demand is relatively large.

\* \* \* \* \*